United States Patent
Morita et al.

(10) Patent No.: US 7,623,964 B2
(45) Date of Patent: Nov. 24, 2009

(54) NAVIGATION SYSTEM

(75) Inventors: Manabu Morita, Zama (JP); Yuko Hamada, Zama (JP); Kazuhiro Toma, Zama (JP); Shoji Kijima, Zama (JP); Hitoshi Koseki, Zama (JP); Takahiko Tada, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 609 days.

(21) Appl. No.: 11/541,534

(22) Filed: Oct. 3, 2006

(65) Prior Publication Data

US 2007/0100545 A1 May 3, 2007

(30) Foreign Application Priority Data

Oct. 5, 2005 (JP) .............................. 2005-292208

(51) Int. Cl.
*G01C 21/34* (2006.01)
(52) U.S. Cl. ..................................... 701/211; 340/995.2
(58) Field of Classification Search .................. None
See application file for complete search history.

(56) References Cited

U.S. PATENT DOCUMENTS

| | | | |
|---|---|---|---|
| 5,654,892 A * | 8/1997 | Fujii et al. .................. 701/211 |
| 5,739,772 A * | 4/1998 | Nanba et al. ................. 340/990 |
| 5,774,071 A * | 6/1998 | Konishi et al. .............. 340/988 |
| 6,345,230 B1 * | 2/2002 | Hiyokawa et al. ........... 701/209 |
| 6,771,189 B2 * | 8/2004 | Yokota ........................ 340/990 |
| 2004/0236507 A1 * | 11/2004 | Maruyama et al. .......... 701/208 |
| 2007/0005241 A1 * | 1/2007 | Sumizawa et al. .......... 701/211 |

FOREIGN PATENT DOCUMENTS

| | | |
|---|---|---|
| JP | 2001-59731 A | 3/2001 |
| WO | WO 2005/020187 A1 * | 3/2005 |

* cited by examiner

*Primary Examiner*—Michael J. Zanelli
(74) *Attorney, Agent, or Firm*—Crowell & Moring LLP

(57) ABSTRACT

A navigation system includes: an intersection enlargement creation unit that creates based upon map data an intersection enlargement over a predetermined map range around a target guidance-requiring intersection present on a recommended route, at which a turn should be made; an intersection enlargement display unit that displays at a display monitor the intersection enlargement having been created by the intersection enlargement creation unit; and a mark display unit that displays an indicator mark indicating an advancing path shape at a next guidance-requiring intersection immediately beyond the target guidance-requiring intersection over the intersection enlargement on display at the display monitor.

8 Claims, 14 Drawing Sheets

FIG. 3
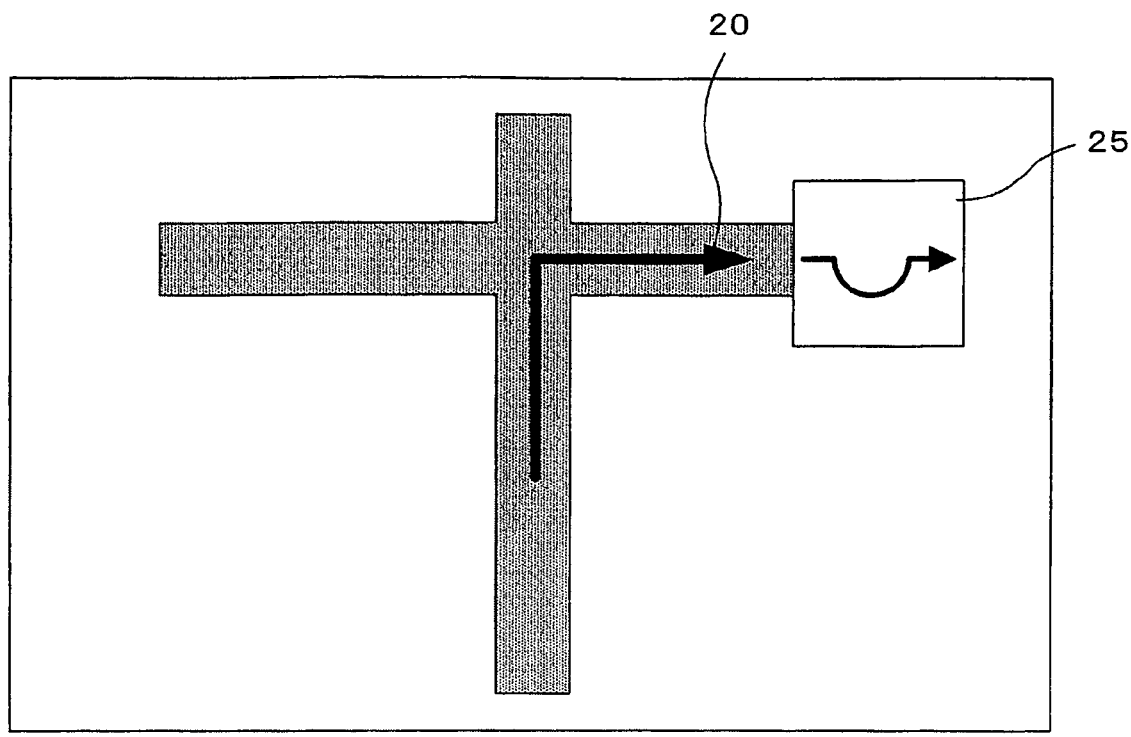
FIG. 4A   FIG. 4B   FIG. 4C
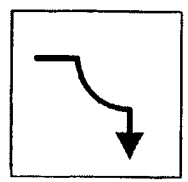 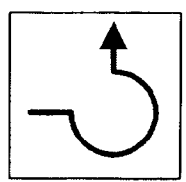 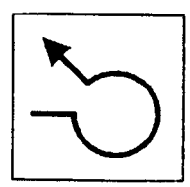

DIRECTIONAL QUANTIZATION
PROCESSING (TWO-PART DIVISION)

SELECT POINT FURTHEST FROM LINE SEGMENT CONNECTING ENDPOINTS

DETERMINE INTERSECTING POINTS BY QUANTIZING LINE SEGMENT DIRECTIONS

DRAWN LINE SEGMENTS EACH CONNECTING SELECTED POINT WITH ENDPOINT

DIRECTIONAL QUANTIZATION
PROCESSING (FOUR-PART DIVISION)

SEQUENTIALLY SELECT POINT FURTHEST FROM LINE SEGMENT

DETERMINE INTERSECTING POINT BY QUANTIZING LINE SEGMENT DIRECTIONS

SAVE POINT

INITIAL LINKS

QUANTIZATION OF LINK DIRECTIONS

CURVILINEAR APPROXIMATION

→ SIMPLIFICATION OF SHAPE DATA →

← CORRECT LANDMARK POSITIONS ←

NAVIGATION SYSTEM

INCORPORATION BY REFERENCE

The disclosure of the following priority application is herein incorporated by reference:

Japanese Patent Application No. 2005-292208 filed Oct. 5, 2005

BACKGROUND OF THE INVENTION

1. Field of the Invention

The present invention relates to a navigation system used in a vehicle.

2. Description of Related Art

A navigation system known in the related art sets a route to a destination and guides a vehicle to the destination by indicating the route on a map on display or providing the driver with audio instructions or visual display instructions indicating the direction in which the vehicle should advance at an intersection (guidance-requiring intersection) where the vehicle needs to make a turn along the route. Such a navigation system may provide driver-friendly instructions when three or more guidance-requiring intersections are present in succession, by displaying the shapes of the two guidance-requiring intersections closest to each other in combination and indicating the vehicle advancing direction with an arrow over the display (see Japanese Laid Open Patent Publication No. 2001-59731).

SUMMARY OF THE INVENTION

The navigation system disclosed in Japanese Laid Open Patent Publication No. 2001-59731 displays the shapes of the two guidance-requiring intersections present over the shortest distance from each other in combination, but displays the shapes of other guidance-requiring intersections individually without combining them. In other words, when the shape of a given guidance-requiring intersection is on display by itself, driver cannot check the vehicle advancing direction at the next guidance-requiring intersection until the vehicle travels past the guidance-requiring intersection currently on display.

According to the 1st aspect of the present invention, a navigation system comprises: an intersection enlargement creation unit that creates based upon map data an intersection enlargement over a predetermined map range around a target guidance-requiring intersection present on a recommended route, at which a turn should be made; an intersection enlargement display unit that displays at a display monitor the intersection enlargement having been created by the intersection enlargement creation unit; and a mark display unit that displays an indicator mark indicating an advancing path shape at a next guidance-requiring intersection immediately beyond the target guidance-requiring intersection over the intersection enlargement on display at the display monitor.

According to the 2nd aspect of the present invention, in the navigation system according to the 1st aspect, it is preferred that when the next guidance-requiring intersection is a circular intersection, the mark display unit displays a circular intersection mark indicating the advancing path shape at the next guidance-requiring intersection as the indicator mark.

According to the 3rd aspect of the present invention, in the navigation system according to the 1st aspect, it is preferred that: there is further provided a first decision-making unit that makes a decision based upon road type information recorded in the map data as to whether or not the next guidance-requiring intersection is a circular intersection; and if the first decision-making unit determines that the next guidance-requiring intersection is a circular intersection, the mark display unit displays the circular intersection mark, whereas if the first decision-making unit does not determine that the next guidance-requiring intersection is a circular intersection, the mark display unit does not display the circular intersection mark.

According to the 4th aspect of the present invention, in the navigation system according to the 1st aspect, it is preferred that when the next guidance-requiring intersection is present within a predetermined range outside the map range for the intersection enlargement, the mark display unit displays a regular intersection mark indicating the advancing path shape at the next guidance-requiring intersection as the indicator mark.

According to the 5th aspect of the present invention, in the navigation system according to the 4th aspect, it is preferred that: there is further provided a second decision-making unit that makes a decision based upon a distance from the target guidance-requiring intersection to the next guidance-requiring intersection as to whether or not the next guidance-requiring intersection is present within the predetermined range; and if the second decision-making unit determines that the next guidance-requiring intersection is present within the predetermined range, the mark display unit displays the regular intersection mark, whereas if the second decision-making unit does not determine that the next guidance-requiring intersection is present within the predetermined range, the mark display unit does not display the regular intersection mark.

According to the 6th aspect of the present invention, in the navigation system according to the 4th aspect, it is preferred that: there is further provided a second decision-making unit that makes a decision based upon a distance from a boundary of the map range for the intersection enlargement to the next guidance-requiring intersection as to whether or not the next guidance-requiring intersection is present within the predetermined range; and if the second decision-making unit determines that the next guidance-requiring intersection is present within the predetermined range, the mark display unit displays the regular intersection mark, whereas if the second decision-making unit does not determine that the next guidance-requiring intersection is present within the predetermined range, the mark display unit does not display the regular intersection mark.

According to the 7th aspect of the present invention, in the navigation system according to any of the 1st through 6th aspects, it is preferred that: there is further provided a distance decision-making unit that make a decision as to whether or not a distance to the target guidance-requiring intersection is equal to or less than a predetermined specific value and, and an abridged map creation unit that creates an abridged map by simplifying shapes of roads present within the predetermined map range if the distance decision-making unit determines that the distance to the target guidance-requiring intersection is equal to or less than the predetermined value; and the intersection enlargement creation unit creates the intersection enlargement based upon the abridged map created by the abridged map creation unit.

According to the 8th aspect of the present invention, a navigation method comprises: creating an intersection enlargement for a target guidance-requiring intersection present on a recommended route, at which a turn should be made, based upon map data over a predetermined map range; displaying the intersection enlargement having been created at a display monitor; and displaying an indicator mark indicating an advancing path shape at a next guidance-requiring intersection present immediately beyond the target guidance-requiring intersection over the intersection enlargement on display at the display monitor.

BRIEF DESCRIPTION OF THE DRAWINGS

FIG. 3 presents an example of an intersection enlargement display according to the present invention that may be brought up in place of the display in FIG. 2

FIGS. 4A~4C presents examples of other circular intersection marks;

FIG. 15 shows how the program may be provided to a personal computer in a recording medium such as a CD-ROM or as a data signal on the Internet or the like.

DESCRIPTION OF PREFERRED EMBODIMENT

Figure 1:
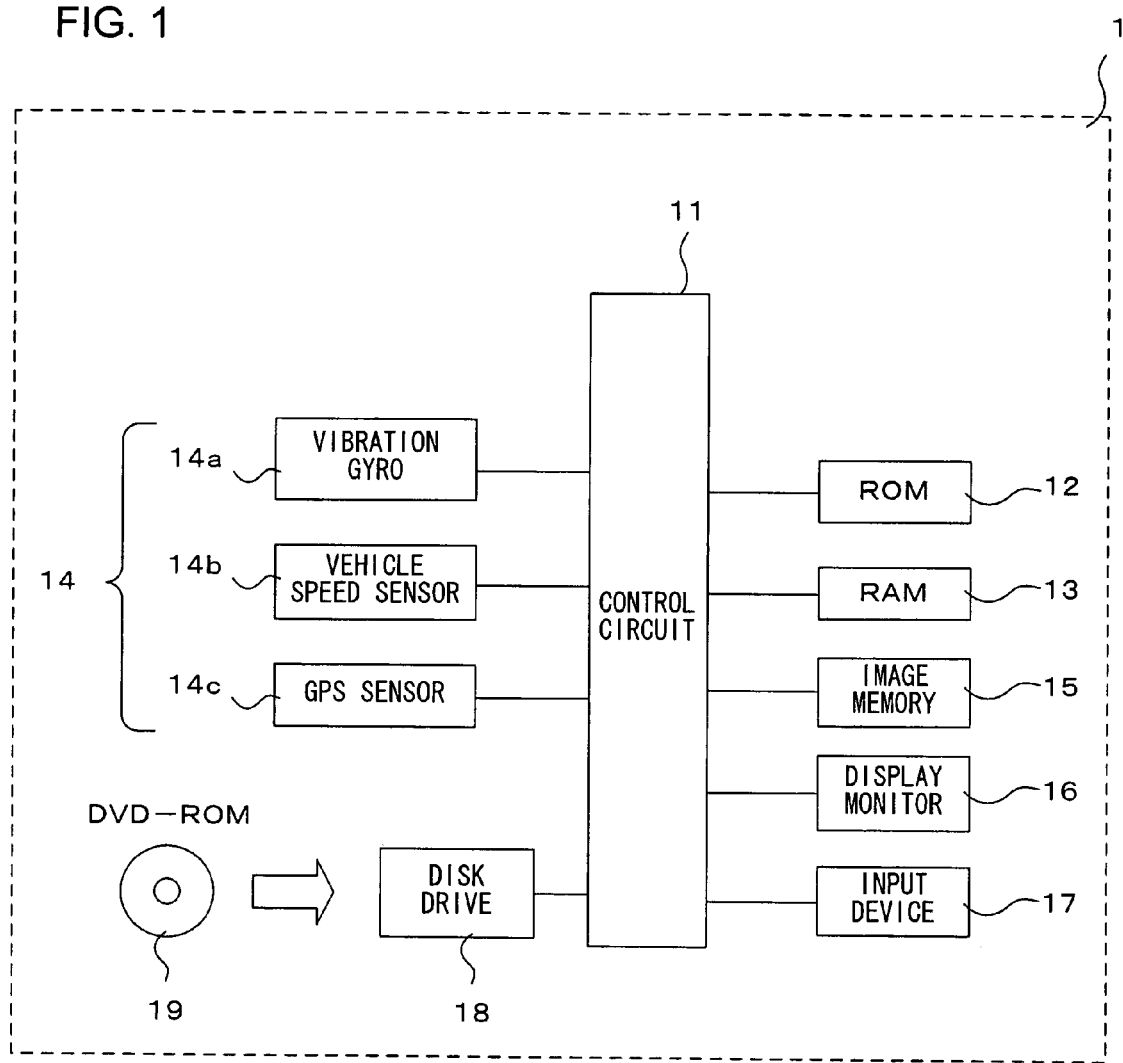
FIG. 1 is a block diagram showing the structure of the navigation system achieved in an embodiment of the present invention.

FIG. 1 shows the structure of the navigation system achieved in an embodiment of the present invention. The navigation system, installed for use in a vehicle, searches for a recommended route to a destination having been set and guides the vehicle to the destination along the recommended route resulting from the search. As the vehicle approaches the next guidance-requiring intersection at which it needs to make a turn, the navigation system creates an abridged map based upon a regular map of the area around the guidance-requiring intersection by simplifying the shapes of the roads present in the area and displays the abridged map as an intersection enlargement. By checking the turning direction indicated with an arrow in the intersection enlargement, the user is able to ascertain at a glance the direction in which the vehicle should advance.

The navigation system 1 in FIG. 1 includes a control circuit 11, a ROM 12, a RAM 13, a current position detection device 14, an image memory 15, a display monitor 16, an input device 17 and a disk drive 18. A DVD-ROM 19 having recorded therein map data is loaded into the disk drive 18.

The control circuit 11 constituted with a microprocessor and its peripheral circuits uses the RAM 13 as its work area when executing a control program stored in the ROM 12 to implement various types of processing and control. The control circuit 11 executes processing such as the search for a recommended route to a destination based upon the map data recorded in the DVD-ROM 19. In addition, an abridged map of an area around a guidance-requiring intersection is created as explained later and the abridged map is displayed as an intersection enlargement at the display monitor 16.

The current position detection device 14, which detects the current position of the subject vehicle, may comprise, for instance, a vibration gyro 14a that detects the advancing direction of the subject vehicle, a vehicle speed sensor 14b that detects the vehicle speed, a GPS sensor 14c that detects a GPS signal transmitted from a GPS satellite and the like. Based upon the current position of the subject vehicle detected by the current position detection device 14, the navigation system 1 determines a route search start point for the recommended route search.

The image memory 15 temporarily holds image data to be displayed at the display monitor 16. The image data include road map drawing data and various types of graphic data used to display the abridged map, which are created by the control circuit 11 based upon the map data recorded in the DVD-ROM 19. Based upon the image data stored in the image memory 15, various types of images including a regular map and an intersection enlargement are displayed at the display monitor 16.

The input device 17 includes various types of input switches through which the user sets a destination and the like. Such an input device may be an operation panel or a remote-control device. By operating the input device 17 as prompted by screen instructions displayed at the display monitor 16, the user is able to set a destination by specifying its geographical name, its position on the map, a facility name or the like and engage the navigation system 1 in a route search for a route to the destination.

The disk drive 18 reads out map data to be used to display a regular map at the display monitor 16 or to create an abridged map of an area around a guidance-requiring intersection from the DVD-ROM 19 loaded therein. It is to be noted that while the map data are read out from the DVD-ROM in this example, the map data may instead be read out from a recording medium other than a DVD-ROM, e.g., a CD-ROM or a hard disk. The map data include route calculation data used when calculating a recommended route, route guidance data indicating intersection names, road names and the like to be used when guiding the subject vehicle to the destination along the recommended route, road data indicating roads and background data indicating shapes of entities other than the roads on the map including shorelines, rivers, railway tracks and various facilities (landmarks) on the map.

The smallest unit of road data indicating a road segment is referred to as a link. Namely, each road is made up of a plurality of links each set in correspondence to a specific road segment. It is to be noted that the lengths of road segments defined by the individual links vary, i.e., the lengths of links vary. A point at which links connect with each other is referred to as a node, which holds position information (coordinate information). In addition, a point referred to as a shape interpolation point may be set between the nodes at the two ends of a given link. The shape interpolation point, too, holds position information (coordinate information) as does a node. Based upon the position information held at the nodes and the shape interpolation points, the shape of each link, i.e., the shape of the corresponding road segment, is determined. The route calculation data include link cost values set therein each in correspondence to one of the links to indicate the length of time required by the subject vehicle to travel through the link.

Once the user sets the destination with the input device 17, the navigation system 1 determines through an arithmetic operation executed based upon the route calculation data, the route to the destination by designating the current position detected by the current position detection device 14 as a route search start point and using a specific algorithm. The recommended route thus determined is indicated on the map on display at the display monitor 16 by altering its display mode, e.g., by using a different display color, so as to ensure that it can easily be distinguished from the other roads. As a result, the user is able to identify the route on the map at the screen.

As the vehicle approaches a guidance-requiring intersection on the recommended route determined as described above, an abridged map of a predetermined map range containing the guidance-requiring intersection is created. Then, an arrow indicating the direction along which the vehicle should make a turn is superimposed on the abridged map and this abridged map with the arrow is displayed at the display monitor 16 as an intersection enlargement. The vehicle-is guided to the destination by using such an intersection enlargement prepared based upon the abridged map and brought up on display at the display monitor 16. In the following explanation, a guidance-requiring intersection for which an intersection enlargement is displayed is referred to as a target guidance-requiring intersection. It is to be noted that a specific method that may be adopted when creating the abridged map is to be explained later.

In addition, if the distance between the target guidance-requiring intersection for which the intersection enlargement is to be brought up on display and the guidance-requiring intersection present on the recommended route immediately beyond the target guidance-requiring intersection (hereafter simply referred to as the "next guidance-requiring intersection") is equal to or less than a predetermined value, an intersection enlargement that allows the target guidance-requiring intersection and the next guidance-requiring intersection to be displayed in combination within a single screen is brought up on display. The intersection enlargement brought up on display under these circumstances is referred to as a combined intersection enlargement. By checking the combined intersection enlargement, the driver is able to ascertain the direction along which he should make a turn at the next guidance-requiring intersection before the vehicle even passes through the target guidance-requiring intersection. In other words, unlike in the related art, in which the advancing direction at the next guidance-requiring intersection is brought up on display only after the vehicle has passed through the target guidance-requiring intersection, the present invention prevents the driver from becoming flustered with instructions following too rapidly one upon the other.

Even when a combined intersection enlargement is not displayed as described above, a display mark indicating the shape of the advancing path at the next guidance-requiring intersection is superimposed on the intersection enlargement if the next guidance-requiring intersection is a special intersection, e.g., a circular intersection or the distance to the next guidance-requiring intersection is relatively short. This aspect of the present invention is now explained in detail in reference to the figures.

Figure 2:
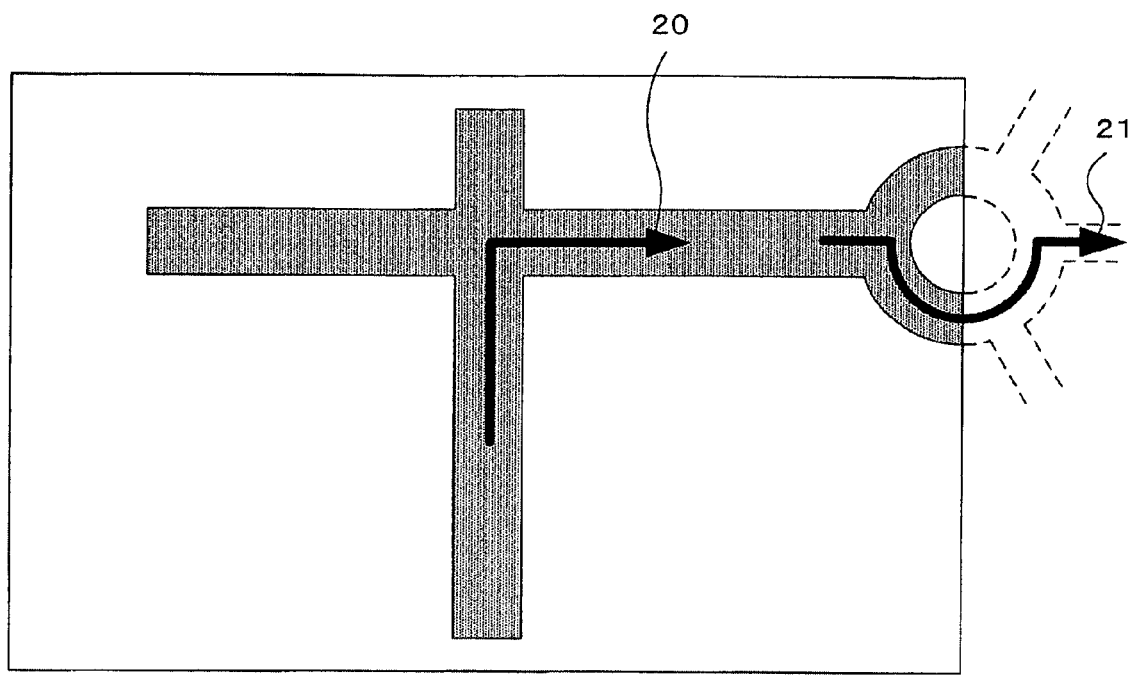
FIG. 2 presents an intersection enlargement display that may be brought up in the related art when the next guidance-requiring intersection is a circular intersection.

FIG. 2 presents an example of an intersection enlargement that may be brought up on display in the related art when the next guidance-requiring intersection is a circular intersection. Part of the circular intersection indicated by the dotted lines and part of a guidance arrow mark 21, which are outside the screen, are not included in the intersection enlargement display. For this reason, the driver cannot ascertain the shape of the overall advancing path at the next guidance-requiring intersection, i.e., the circular intersection.

The navigation system 1 according to the present invention addresses this problem by displaying an intersection enlargement such as that shown in FIG. 3 instead of the intersection enlargement in the related art shown in FIG. 2. This intersection enlargement includes a guidance arrow mark 20 indicating the direction along which the vehicle should advance at the target guidance-requiring intersection. In addition, ahead of the guidance arrow mark 20, a circular intersection mark 25 that simulates the shape of the advancing path at the next guidance-requiring intersection, i.e., the circular intersection, is displayed.

The circular intersection mark is displayed in the intersection enlargement assumes different designs, each in correspondence to how the vehicle is to advance at the next guidance-requiring intersection, i.e., the circular intersection. The circular intersection mark 25 in FIG. 3 indicates that the vehicle is to advance to the opposite side of the entry position via the circular intersection. Under different circumstances, circular intersection marks such as those shown in FIGS. 4A~4C may be displayed. The circular intersection mark in FIG. 4A indicates that the vehicle having entered the circular intersection should drive approximately a quarter of the way along the circular intersection and then advance to the right side relative to the entry position. FIG. 4B indicates that the vehicle having entered the circular intersection should drive approximately three quarters of the way along the circular intersection and then advance to the left side relative to the entry position. FIG. 4C indicates that the vehicle having entered the circular intersection should drive approximately seven eighths of the way along the circular intersection and then advance to the left side toward the entry position. It is to be noted that these circular intersection marks simply represent examples and various other circular intersection marks may be used each in correspondence to a specific advancing path shape.

A circular intersection may be a roundabout or a traffic circle around a railway station. A decision as to whether or not the next guidance-requiring intersection is a circular intersection can be made based upon road type information recorded in the map data. Namely, specific road type information indicating a roundabout or a traffic circle is recorded in advance in the map data in correspondence to a road corresponding to a roundabout or a rotary. Thus, a road in correspondence to which such specific road type information is recorded, present on the recommended route, can be judged to be a circular intersection.

Figure 5:
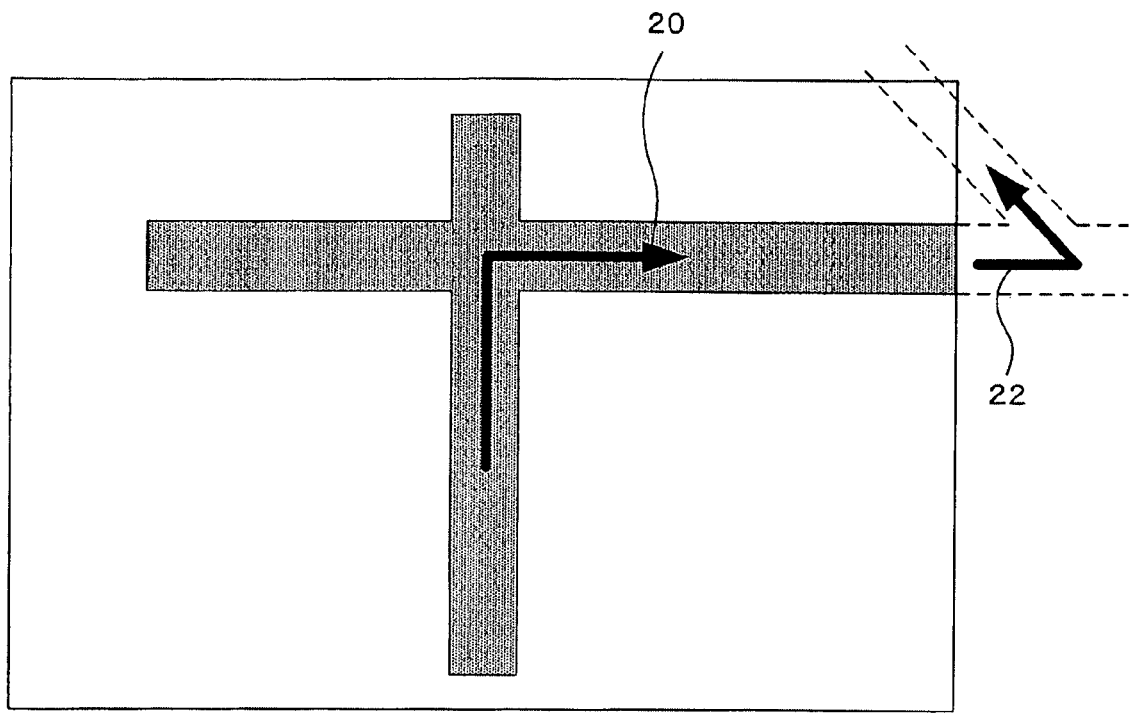
FIG. 5 presents an example of an intersection enlargement display that may be brought up in the related art when the distance to the next guidance-requiring intersection is relatively short.

FIG. 5 presents an example of an intersection enlargement that may be brought up on display in the related art when the distance to the next guidance-requiring intersection is relatively short. The portion indicated by the dotted lines and a guidance arrow mark 22, which are outside the display screen, are not included in the intersection enlargement. However, when the vehicle is to make a turn with an acute angle at the next guidance-requiring intersection as indicated by the guidance arrow mark 22, the road ahead initially outside the display range may enter the display. In other words, even when the next guidance-requiring intersection is outside the display range, the road beyond the next guidance-requiring intersection may come into the display if the distance from the target guidance-requiring intersection to the next guidance-requiring intersection is relatively short.

Figure 6:
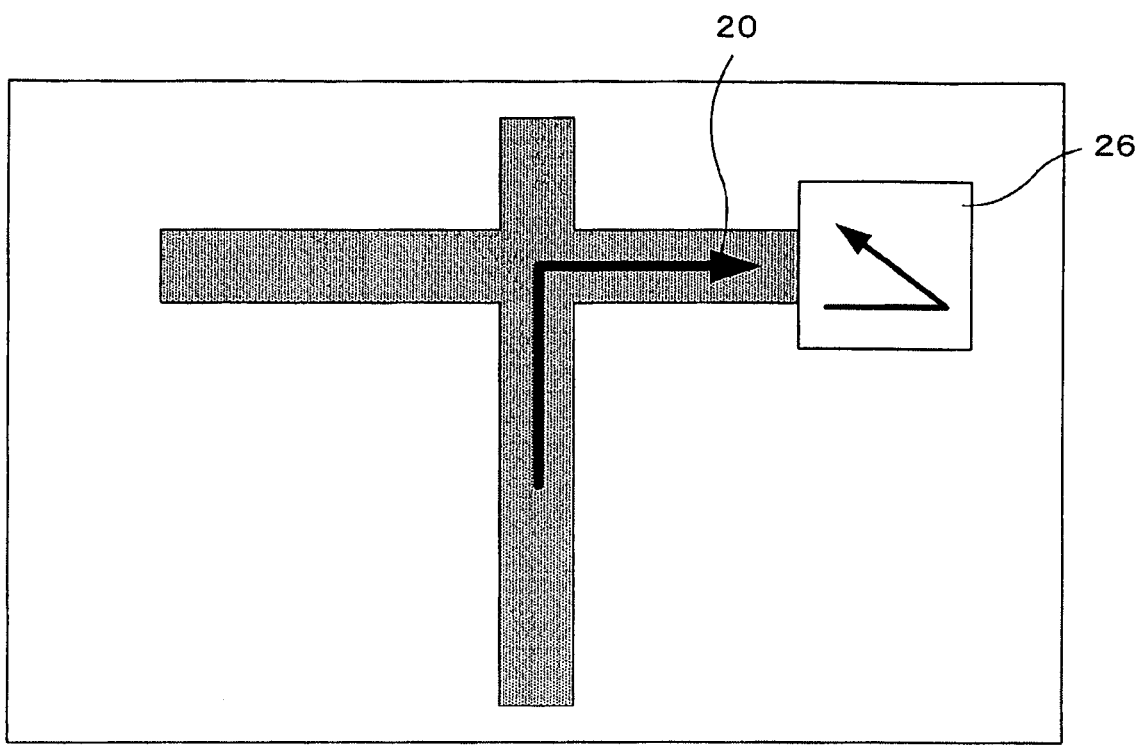
FIG. 6 presents an example of an intersection enlargement display according to the present invention that may be brought up in place of the display in FIG. 5.

The navigation system 1 according to the present invention addresses this problem by displaying an intersection enlargement such as that shown in FIG. 6, instead of the intersection enlargement in the related art shown in FIG. 5. An intersection mark 26 simulating the advancing path shape at the next guidance-requiring intersection is superimposed on the intersection enlargement in FIG. 6. In the following explanation, the intersection mark 26, which indicates a regular intersection instead of a circular intersection, is to be referred to as a regular intersection mark so as to make it easily distinguishable from the circular intersection mark 25 having been explained in reference to FIG. 3. While the design of the regular intersection mark, too, changes in correspondence to the advancing path shape at the next guidance-requiring intersection, as in the case of the circular intersection mark, a detailed explanation of a specific design that may be adopted is not provided here.

It is to be noted that in the explanation provided above, a regular intersection mark is displayed over the intersection enlargement when, for instance, the vehicle makes a turn at the next guidance-requiring intersection with an acute angle and thus the road ahead outside the display range enters the display. However, it is desirable to display a regular intersection mark in the intersection enlargement in a similar manner even when the road ahead does not come into the display, if the distance from the target guidance-requiring intersection to the next intersection is relatively short.

More specifically, a regular intersection mark should be displayed in the intersection enlargement if the next guidance-requiring intersection is outside the map range for the intersection enlargement and, at the same time, present within a predetermined range. The decision as to whether or not the next guidance-requiring intersection is within the predetermined range may be made relative to the target guidance-requiring intersection or relative to the boundary of the map range for the intersection enlargement. Namely, if the next guidance-requiring intersection is outside the screen display range and the distance from the target guidance-requiring intersection to the next guidance-requiring intersection is equal to or less than the predetermined value, or if the next guidance-requiring intersection is outside the display range and the distance from the boundary of the map range for the intersection enlargement to the next guidance-requiring intersection is equal to or less than a predetermined value, the regular intersection mark 26 indicating the advancing path shape at the next guidance-requiring intersection is brought up on display over the intersection enlargement, as shown in FIG. 6.

Figure 7:
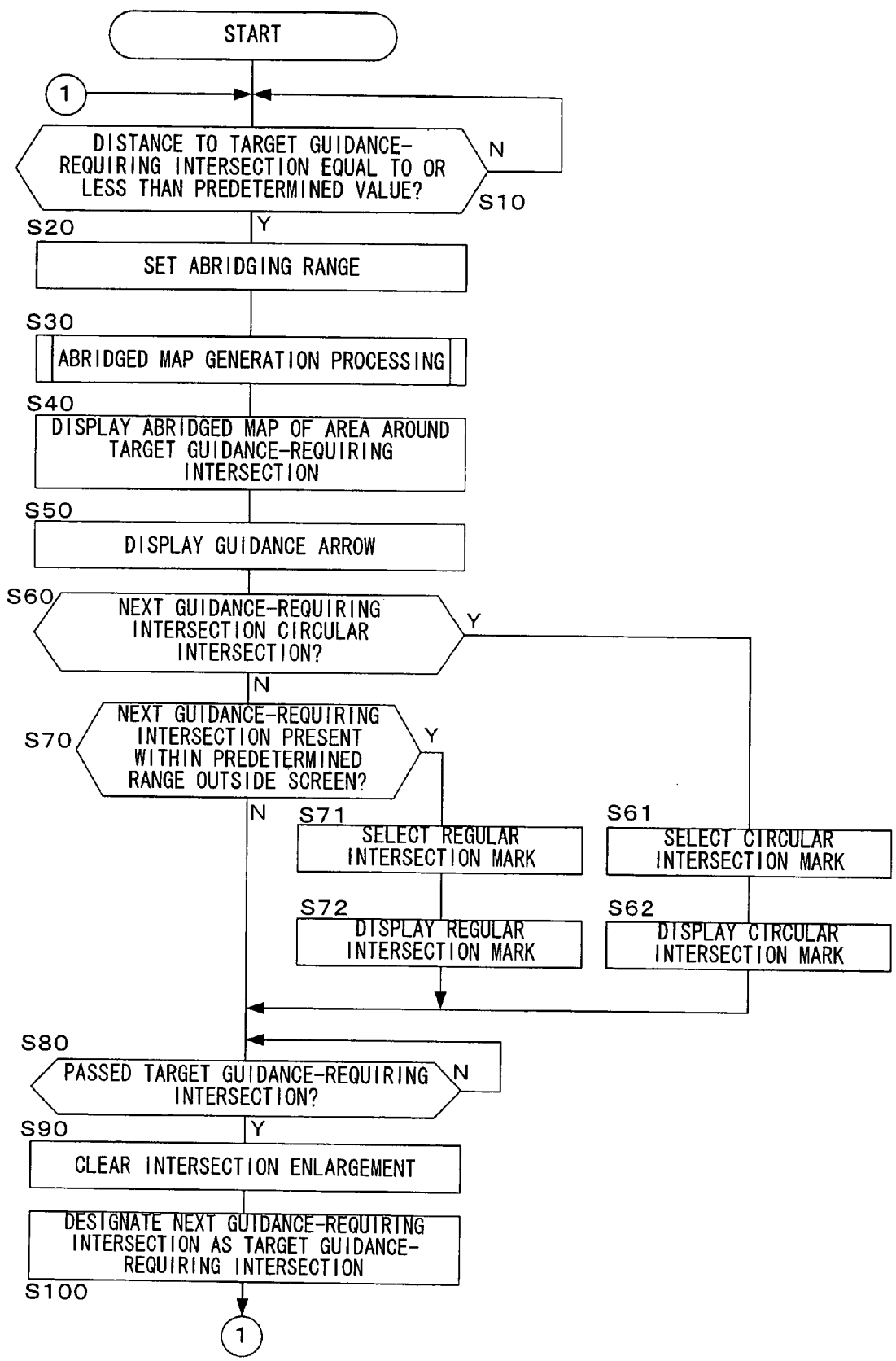
FIG. 7 presents a flowchart of the processing executed when displaying an intersection enlargement.

FIG. 7 presents a flowchart of the processing program executed in the navigation system 1 to display the intersection enlargement, as explained above. The processing in the flowchart is executed by the control circuit 11 while the vehicle is being guided to the destination along the recommended route resulting from a search. In step S10, a decision is made as to whether or not the distance from the current vehicle position to a target guidance-requiring intersection is equal to or less than a predetermined specific value, e.g., 300 m. In this situation, the guidance-requiring intersection present ahead on the recommended route along the vehicle advancing direction and closest to the vehicle is designated as the target guidance-requiring intersection. The operation proceeds to the following step S20 when the distance to the target guidance-requiring intersection has become equal to or less than the predetermined value.

In step S20, the map range over which an abridged map is to be created, i.e., the abridging range, is set. In this step, a predetermined map range around the target guidance-requiring intersection is set as the abridging range. If the next guidance-requiring intersection is present over a small distance equal to or less than a predetermined value, the abridging range is set so as to contain the two guidance-requiring intersections. In the following step S30, abridged map generation processing is executed to create a map over the abridging range having been set in step S20. As a result, an abridged map is created by simplifying the shapes of roads around the target guidance-requiring intersection. The abridged map generation processing is to be explained in specific detail later.

In step S40, the abridged map having been created in step S30 is brought up on display at the display monitor 16 as the intersection enlargement. The shape of the target guidance-requiring intersection is thus indicated in the intersection enlargement. In the following step S50, the guidance arrow mark indicating the direction along which the vehicle should make a turn at the guidance-requiring intersection is displayed over the abridged map having been brought up on display in step S40. The guidance arrow mark 20 shown in FIG. 3 or 6 is brought up on display as a result.

In step S60, a decision is made as to whether or not the next guidance-requiring intersection is a circular intersection. In this step, the decision as to whether or not the next guidance-requiring intersection is a circular intersection is made based upon the road type information included in the map data, as explained earlier. The operation proceeds to step S61 if the next guidance-requiring intersection is judged to be a circular intersection. In step S61, a circular intersection mark matching the advancing path shape at the next guidance-requiring intersection is selected. In step S62, the circular intersection mark having been selected in step S61 is displayed over the abridged map having been brought up on display in step S40. The intersection enlargement in FIG. 3 is thus brought up on display at the display monitor 16. Once step S62 is executed, the operation proceeds to step S80. If, on the other hand, it is decided in step S60 that the next guidance-requiring intersection is not a circular intersection, the operation proceeds to step S70 without displaying a circular intersection mark.

In step S70, a decision is made as to whether or not the next guidance-requiring intersection is present within a predetermined range outside the screen. This decision as to whether or not the next guidance-requiring intersection is present within the predetermined range is made based upon the criteria having been explained earlier. Namely, the next guidance-requiring intersection is judged to be present within the predetermined range and the operation proceeds to step S71, if the distance from the target guidance-requiring intersection to the next guidance-requiring intersection is equal to or less than a predetermined value or if the shortest distance from the boundary of the map range for the intersection enlargement, i.e., the boundary of the abridging range having been set in step S20, to the next guidance-requiring intersection is equal to or less than a predetermined value. It is to be noted that one of these sets of criteria should be pre-selected as the decision-making criteria.

If it is decided in step S70 that the predetermined decision-making criteria are not satisfied and the next guidance-requiring intersection is judged to be present outside the predetermined range beyond the screen, the operation proceeds to step S80. In this case, no circular intersection mark or regular intersection mark is brought up on display, and either an intersection enlargement for the target guidance-requiring intersection alone, such as that in the related art, or an intersection enlargement indicating the target guidance-requiring intersection and the next guidance-requiring intersection in combination is displayed.

In step S71, a regular intersection mark matching the advancing path shape at the next guidance-requiring intersection is selected. In step S72, the regular intersection mark having been selected in step S71 is displayed over the abridged map having been brought up on display in step S40. The intersection enlargement in FIG. 6 is thus brought up on display at the display monitor 16. Once step S72 is executed, the operation proceeds to step S80.

In step S80, a decision is made as to whether or not the vehicle has already passed the target guidance-requiring intersection, i.e., the guidance-requiring intersection the intersection enlargement of which, e.g., the intersection enlargement in FIG. 3 or FIG. 6, has been brought up on display at the display monitor 16 through the processing having been executed up to step S70. If it is decided that the vehicle has already passed the target guidance-requiring intersection, the operation proceeds to the following step S90 to clear the intersection enlargement from the display monitor 16. It is to be noted that if the intersection enlargement on display includes a plurality of guidance-requiring intersections, the operation proceeds from step S80 to step S90 after the vehicle passes through the last guidance-requiring intersection.

In step S100, the next guidance-requiring intersection is designated as the target guidance-requiring intersection. Once step S100 is executed, the operation returns to step S10 to repeatedly execute the processing described above. Thus, the intersection enlargement is displayed for the next guidance-requiring intersection now designated as the new target guidance-requiring intersection, as the vehicle reaches a point at which the distance to the target guidance-requiring intersection is equal to or less than the predetermined value, and a circular intersection mark or a regular intersection mark is displayed in correspondence to a next guidance-requiring intersection ahead of the guidance-requiring intersection. As explained above, each time the vehicle approaches a guidance-requiring intersection, the guidance-requiring intersection is designated as the target guidance-requiring intersection for which the intersection enlargement is brought up on display, and in addition, the shape of the next guidance-requiring intersection is indicated to the driver.

Figure 8:
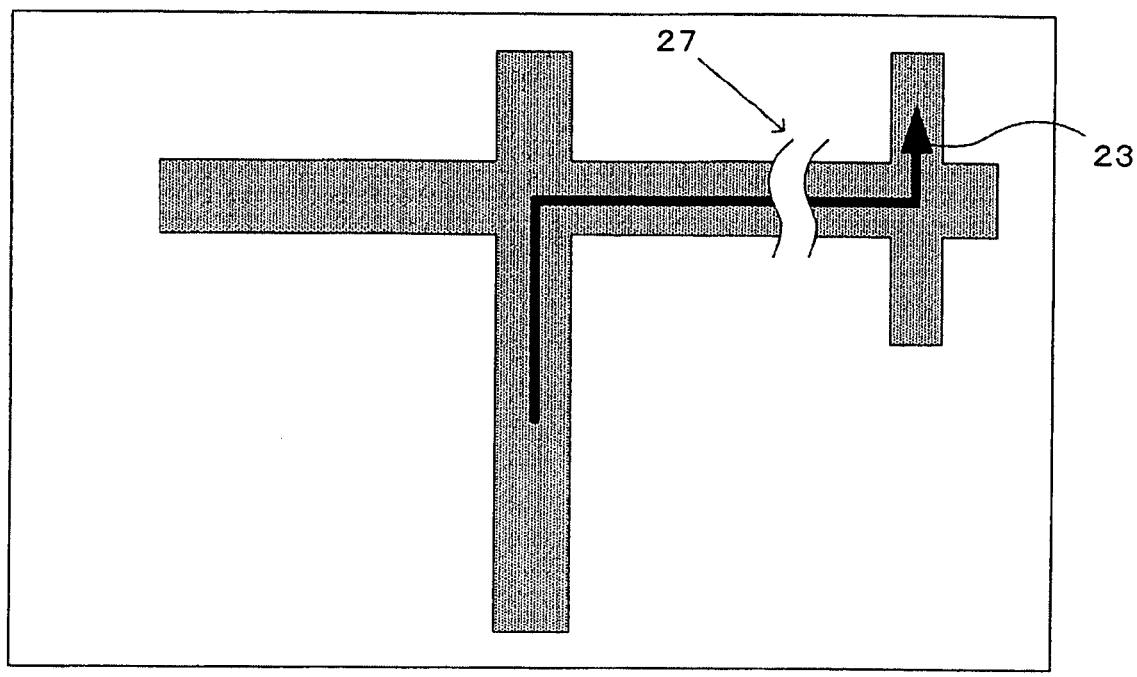
FIG. 8 presents another example of an intersection enlargement display.

It is to be noted that while an intersection enlargement such as that shown in FIG. 3 or 6 is displayed to indicate the shape of the next guidance-requiring intersection by using the circular intersection mark 25 or the regular intersection mark 26 in the explanation given above, an intersection enlargement such as that shown in FIG. 8 may be brought up on display instead. In this intersection enlargement, the road extending between the target guidance-requiring intersection and the next guidance-requiring intersection is partially omitted from the display by using an omit mark indicated by reference numeral 27, so as to contain the target guidance-requiring intersection and the next guidance-requiring intersection within a single screen. A guidance arrow mark 23 is brought up on display over the intersection enlargement to indicate the direction along which the vehicle should advance via the target guidance-requiring intersection and the next guidance-requiring intersection. This alternative also makes it possible to display an intersection enlargement each time the vehicle approaches a guidance-requiring intersection to indicate it as the target guidance-requiring intersection and indicate the shape of the next guidance-requiring intersection to the driver.

Next, the abridged map generation processing executed in step S30 is explained in detail. In the abridged map generation processing, processing referred to as directional quantization processing is executed to simplify the shapes of road segments constituting the route and an abridged map indicating the route constituted with road segments, the shapes of which have been thus simplified, is generated. The following is an explanation of the directional quantization processing.

In the directional quantization processing, each link present on the recommended route resulting from the search is divided into a predetermined number of parts and then the road segment shape is simplified. FIGS. 9A~9D and FIGS. 10A~10D illustrate in detail the directional quantization processing. While FIGS. 9A~9D illustrate the directional quantization processing executed by dividing each link into two parts (two-part division), FIGS. 10A~10D illustrate the directional quantization processing executed by dividing each link into four parts (four-part division). The two-part division processing directional quantization processing shown in FIGS. 9A~9D is first explained.

Figure 9A:
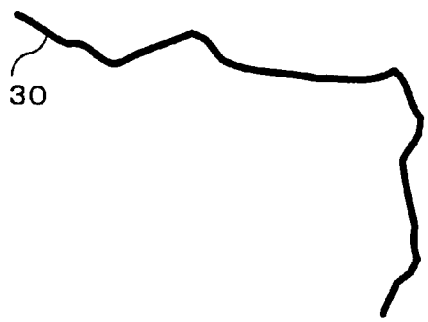
FIGS. 9A~9D show in detail two-part division directional quantization processing executed when creating an abridged map.
Figure 9B:
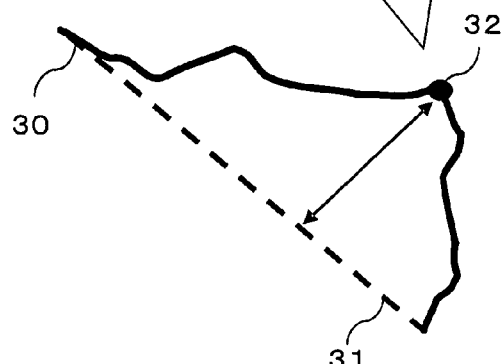

Reference numeral 30 in FIG. 9A indicates a link present on the route resulting from the search. A point 32 on the link 30, present over the greatest distance from a line segment 31 connecting the two endpoints of the link 30, is selected as shown in FIG. 9B. The point 32 selected as described above is equivalent to the shape interpolation point mentioned earlier, whereas the two endpoints are equivalent to nodes.

Once the point 32 is determined, line segment 33 and 34 each connecting one of the two ends of the link 30 with the point 32 are set. θ1 and θ2 respectively represent the angles formed by the line segments 33 and 34 relative to reference lines. It is to be noted that the term "reference line" in this context refers to a line extending from each endpoint of the link 30 along a predetermined specific direction (e.g., true north). As FIG. 9C indicates, θ1 represents the angle formed by the reference line extending from one of the endpoints and the line segment 33 and 92 represents the angle formed by the reference line extending from the other endpoint and the line segment 34.

Figure 9D:
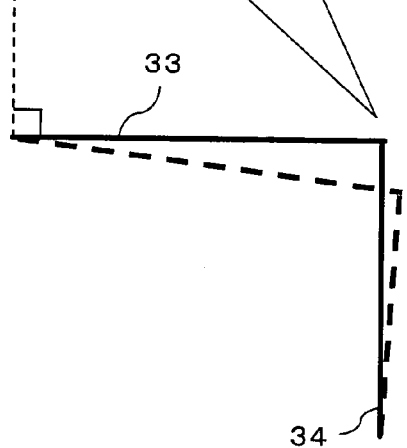
Figure 9C:
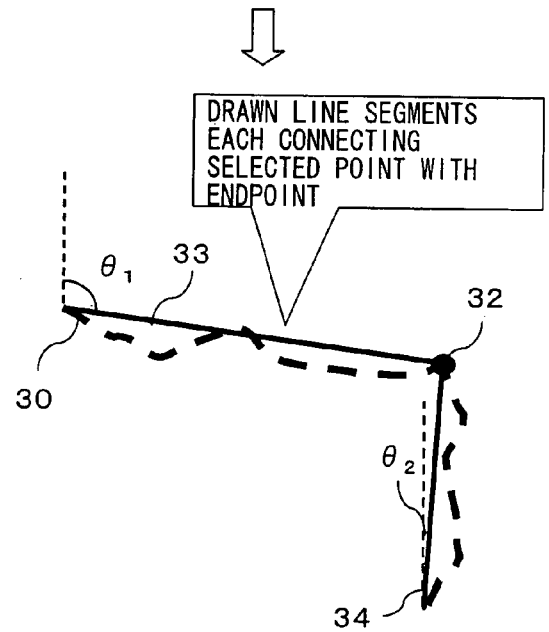

Once the line segments 33 and 34 connecting the point 32 with the two endpoints of the link 30 are set as described above, the directions of the line segments 33 and 34 are individually quantized as shown in FIG. 9D. Directional quantization in this context refers to individually rotating the line segments 33 and 34 around the corresponding endpoints so as to set the angles θ1 and θ2 to values that are integral multiples of a predetermined unit angle. Namely, the initial values of θ1 and θ2 are corrected by individually rotating the line segments 33 and 34 so that $θ1 = m \cdot \Delta θ$ and $θ2 = n \cdot \Delta θ$ (n and m are integers) are true. m and n in the expressions above assume values at which the corrected values of θ1 and θ2, calculated as expressed above, are the closest to the initial values.

After the directions of the line segments 33 and 34 are individually quantized as explained above, the angles θ1 and θ2 formed by the line segments 33 and 34 and the reference lines are corrected in steps each corresponding to the unit angle Δθ. It is to be noted that Δθ=15° in FIG. 9D. In the example presented in FIG. 9, m is set to 6 for θ1 so as to set the corrected angle to 90°, whereas n is set to 0 for θ2 so as to set the corrected angle to 0°.

Once the directions of the line segments 33 and 34 are individually quantized, a point at which extensions of the line segments 33 and 34 intersect each other is determined. Then, the lengths of the line segments 33 and 34 are individually corrected as shown in FIG. 9D by connecting the intersecting point with the two endpoints.

As described above, by first setting the line segments 33 and 34, quantizing their directions and also correcting their lengths, the two-part division directional quantization processing is executed for the link 30. By using the line segments 33 and 34 in place of the link 30, the shape of the link 30 can be simplified. Since the shape of the link 30 is simplified by holding the two endpoints of the link 30 at fixed positions, the directional quantization does not affect the positional relationships with the adjacent links. Thus, by individually simplifying the shapes of the links constituting the route through the directional quantization processing, the road segment shapes can be simplified with ease while sustaining an accurate overall positional relationship among the links present on the route.

Figure 10A:
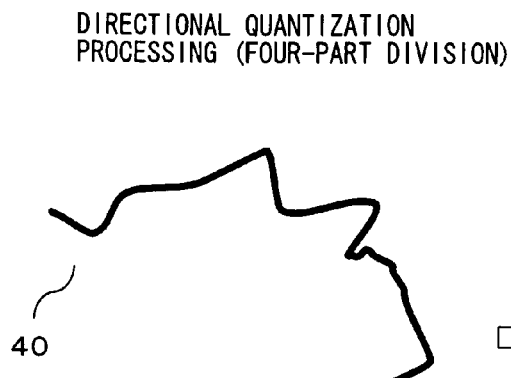
FIGS. 10A~10D show in detail four-part division directional quantization processing executed for similar purposes.
Figure 10B:
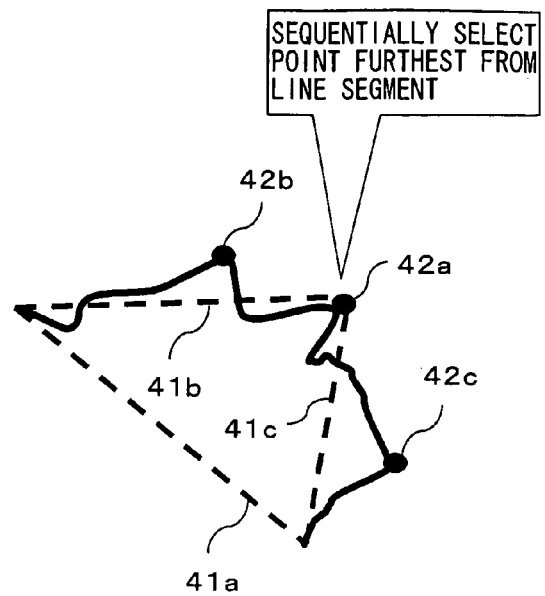

Next, the four-part division directional quantization processing is explained. FIG. 10A shows a link indicated by reference numeral 40, present on the route resulting from the search, as does FIG. 9A. A point 42a on the link 40, present over the greatest distance from a line segment 41a connecting the two endpoints of the link 40 is selected as shown in FIG. 10B. Next, line segments 41b and 41c each connecting one of the two endpoints of the link 40 with the point 42a are set, and points 42b and 42c on the link 40 assuming positions furthest from the line segments 41b and 41c respectively are selected. The points 42a~42c selected as described above are each equivalent to a shape interpolation point, as has been explained in reference to the two-part division processing, whereas the two endpoints are equivalent to nodes.

Figure 10D:
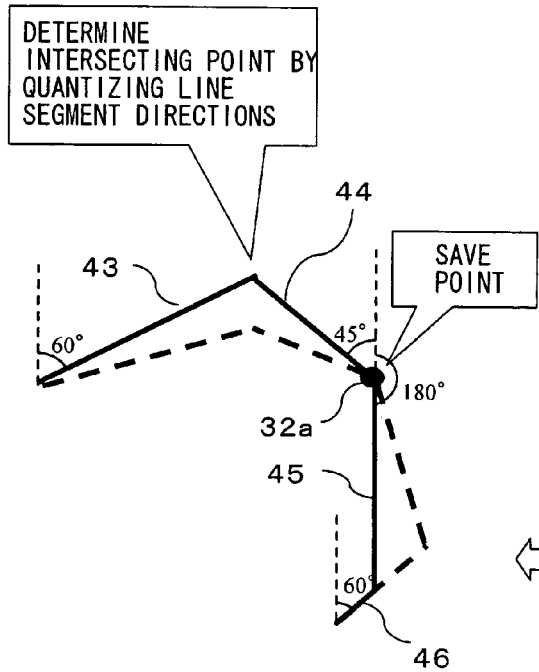
Figure 10C:
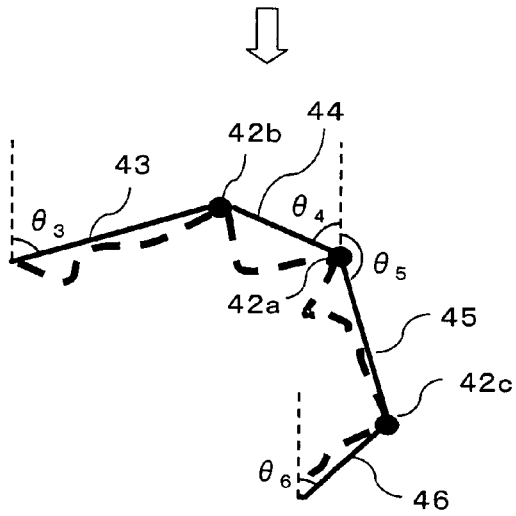

Once the points 42a~42c are determined as described above, line segments 43, 44, 45 and 46 respectively connecting one of the endpoints of the link 40 with the point 42b, the point 42b with the point 42a, the point 42a with the point 42c and the point 42c with the other endpoint of the link in this order are set as shown in FIG. 10C in a manner similar to that adopted in the two-part division directional quantization processing. θ3, θ4, θ5 and θ6 represent the angles formed by the line segments 43~46 relative to the corresponding reference lines. It is to be noted that in the four-part division directional quantization processing, a reference line is set in correspondence to the initially selected point 42a present in the middle among the points 42a~42c in addition to the reference lines set in correspondence to the two endpoints of the link 40.

Once the line segments 43~46 are set as described above, the directions of the line segments are individually quantized, as shown in FIG. 10D. At this time, the point 42a is designated as a save point and the line segments 44 and 45 are each made to rotate around the save point 42. It is to be noted that the line segments 43 and 46 are made to rotate around the two endpoints, as in the two-part division directional quantization processing. In this example, Δθ is set in advance to 15°, and the angles θ3~θ6 are corrected to be 60°, 45°, 180° and 60° respectively.

After the directions of the line segments 43~46 are individually quantized, a point at which extensions of the line segments 43 and 44 intersect each other and a point at which extensions of the line segments 45 and 46 intersect each other are determined. Then, the lengths of the line segments 43~46 are individually corrected as shown in FIG. 10D by connecting each intersecting point with the closest endpoint and also with the save point 42a.

As explained above, the line segments 43~46 are determined, their directions are quantized and their lengths are corrected in the four-part division directional quantization processing for the link 40. By using the line segments 43~46 in place of the link 40, the shape of the link 40 can be simplified. In the four-part division directional quantization processing, the shape of the link 40 is simplified while the save point 42a is held at a fixed position as well as the two endpoints of the link 40. As a result, even when the route is made up with links with complicated shapes, the road segment shapes can be simplified in an optimal manner by maintaining the overall positional relationship among the links.

It is to be noted that while an explanation is given above on the two-part division directional quantization processing and the four-part division directional quantization processing, directional quantization processing can be executed in a similar manner by dividing each link into another number of parts. For instance, eight-part division directional quantization processing may be executed in a manner similar to that with which the four-part division directional quantization is executed, by first selecting a point furthest from the line segment connecting the two endpoints of the link and then selecting two points furthest from two line segments connecting the first point with the two endpoints. Subsequently, four points furthest from four line segments each connecting the two successive points among these three points and the two endpoints are selected. Eight line segments with which the two endpoints are connected via the seven selected points in between are determined, and the eight-part division directional quantization processing is executed by quantizing the directions of the eight line segments and correcting their lengths, as explained earlier.

The number of parts into which the target link is to be divided during the directional quantization processing may be set in advance, or it may be determined based upon the shape of the subject link. For instance, when sequentially selecting the point farthest from the line segment connecting the two endpoints or farthest from a line segment connecting an endpoint and a previously selected point or connecting previously selected points, i.e., when repeatedly executing the processing having been explained in reference to FIG. 9B and FIG. 10B, the processing may be continuously executed until the distance between each line segment and the furthest point becomes equal to or less than a predetermined value and points, the quantity of which corresponds to the number of times the processing has been executed, may be sequentially selected. This makes it possible to determine the number of parts into which the subject link is to be divided in the directional quantization processing based upon the link shape.

In the two-part division directional quantization processing, having been explained in reference to FIGS. 9A~9D, there may not be a point at which extensions of the directionally quantized line segments 33 and 34 intersect each other. Namely, if the directionally quantized line segments 33 and 34 are aligned in parallel with each other, their extensions will connect the two line segments, forming a single line segment connecting the two endpoints of the link 33. In this case, no intersecting point exists. Under such circumstances, the shape of the link 30 may be simplified by replacing the link 30 with the line segment directly connecting the two endpoints, i.e., the line segment 31. In addition, if there is no suitable intersecting point of extensions of the directionally quantized line segments in the four-part division directional quantization processing having been explained in reference to FIG. 10A~FIG. 10D or in directional quantization processing executed by dividing each link into a greater number of parts, directional quantization processing should be executed by dividing the link into a smaller number of parts.

By sequentially executing the directional quantization processing explained above on all the links present on the route, the shapes of the roads making up the route can be simplified and thus an abridged map showing the roads making up the route in simplified shapes can be created. It is to be noted that directional quantization processing such as that described above may be executed in units of link strings each made up of a plurality of links, instead of in units of links. In such a case, nodes as well as shape interpolation points may be selected as the point 32 in FIGS. 9A~9D and the points 42a~42c in FIGS. 10A~10D.

In addition, the shapes of roads may be simplified in the abridged map generation processing without executing the directional quantization processing described above. For instance, the road shapes may be simplified by approximating the shapes of the individual links with curved lines as explained below in reference to FIGS. 11A~11C.

Figure 11A:
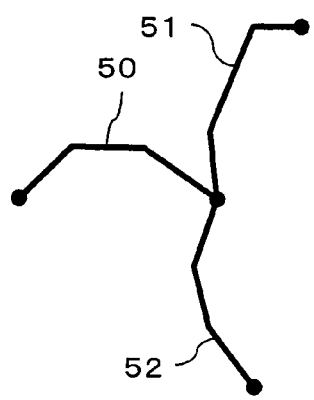
FIGS. 11A~11C show a method for simplifying the shapes of roads on the route by approximating the shapes of links with curved lines.
Figure 11B:
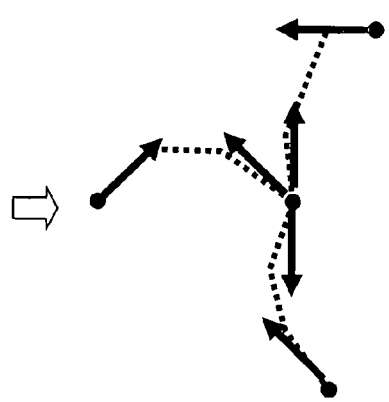

FIG. 11A shows links 50, 51 and 52, some of the links present on the route resulting from the search. Quantization is executed at the two endpoints of each of the links 50~52, as shown in FIG. 11B, to determine the link directions at the endpoints. In this example, each link direction is determined in a manner similar to that with which the direction of each line segment is quantized in the directional quantization processing explained earlier so as to achieve an angle that is an integral multiple of the unit angle and is the closest to the initial angle. As a result, a link direction is determined in correspondence to each endpoint, as indicated by the arrows in FIG. 11B.

Figure 11C:
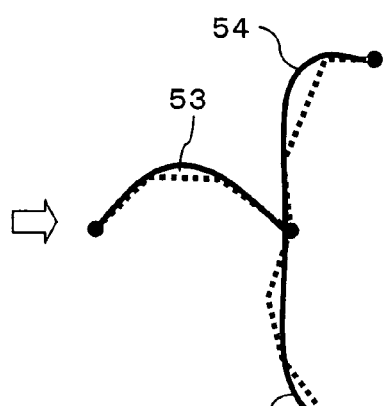

Next, curved lines 53, 54 and 55 connecting the endpoints, as shown in FIG. 11C, are determined to curvilinearly approximate the shapes of the individual links. At this time, the shapes of the curved lines 53~55 are each determined so as to match the directions of the tangential lines near the endpoints of the curved line with the quantized link directions. It is to be noted that such curved lines may be determined through spline approximation by using, for instance, a spline function, a detailed explanation of which is not provided in this description.

By sequentially executing the processing described above for all the links present on the recommended route and indicating the road shapes with the curved lines determined through the processing, an abridged map showing the roads in simplified shapes can be created. As in the directional quantization processing, the shape of each link is simplified while holding the two endpoints of the link at fixed positions. Thus, the road shapes can be simplified with ease while sustaining the initial positional relationship among the links making up the route through the curved linear approximation.

Then, landmarks indicating the positions of various types of facilities and the like are displayed on the abridged map thus created. However, as the road shapes are simplified, the positions of the roads in the abridged map become different from their positions in the initial map. For this reason, the landmarks displayed at the original positions on the abridged map would not indicate the correct positional relationships between the roads and the landmarks. Accordingly, it is necessary to correct the landmark positions before displaying the landmarks on the abridged map. The following is an explanation of the method adopted to execute the landmark position correction.

Figure 12A:
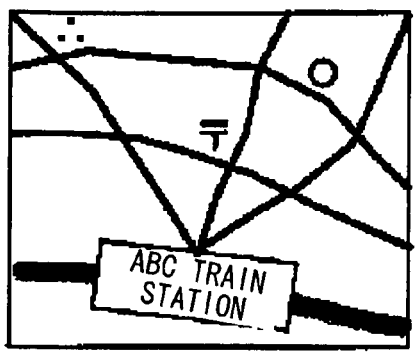
FIGS. 12A~12C outline the landmark position correction.
Figure 12B:
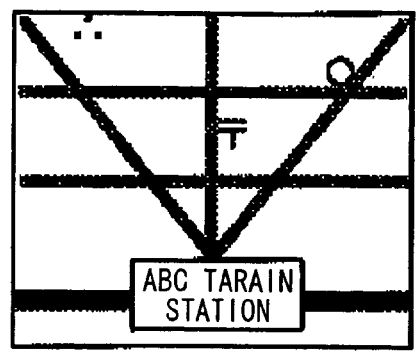
Figure 12C:
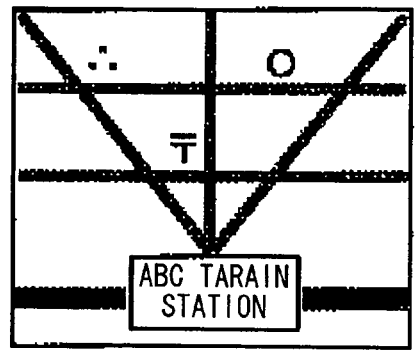

FIGS. 12A~12C, outline the landmark position correction. As shown in FIG. 12A, subtle positional relationships between the landmark positions and the roads are reflected in the initial map prior to the abridgment processing. When the abridged map generation processing described above is executed on this initial map and the original positions of the landmarks are displayed on the map without any correction, the resulting abridged map may be as shown in FIG. 12B.

In the abridged map shown in FIG. 12B, the shape data are simplified and only the road positions are altered from their positions in the initial map in FIG. 12A and the actual positional relationships between the landmarks and the roads are not correctly reflected. More specifically, the position of the post office located around the center of the map is indicated in the abridged map in FIG. 12B on the side of the road opposite from the side on which it is indicated in the initial map in FIG. 12A. As the means for addressing this problem, the landmark position correction is executed to approximate the positional relationships between the roads and the landmarks in the abridged map to the positional relationships in the initial map, as shown in FIG. 12C.

Figure 13A:
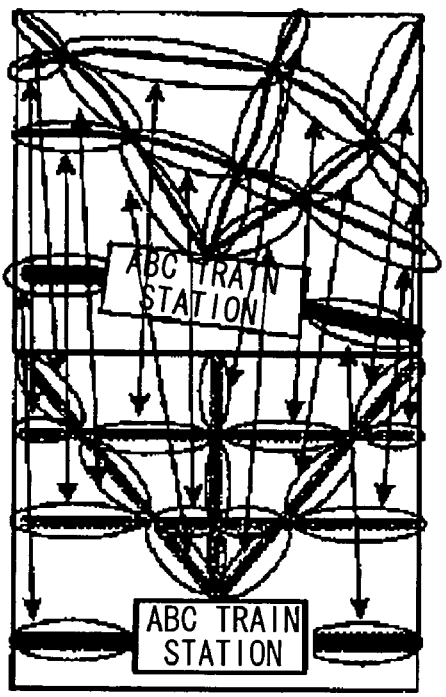
FIGS. 13A and 13B illustrate the detail algorithm used in the landmark position correction.
Figure 13B:
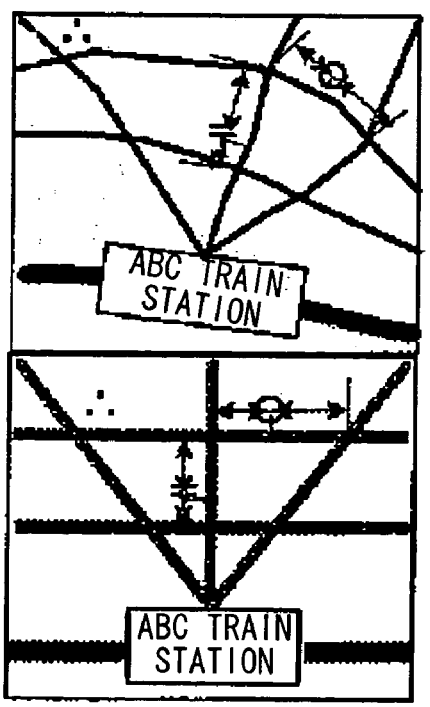

Next, in reference to FIGS. 13A and 13B, the detail algorithm used in the landmark position correction is explained. In the landmark position correction, a pair list of pairs of shape vectors, each pair made up of a pre-abridge shape vector and a corresponding post-abridge shape vector, is generated as shown in FIG. 13A. When the abridgment processing explained earlier is executed to abridge the initial map, the number of make-up points constituting each shape vector indicating a road shape changes from the initial number. Accordingly, when compiling the pair list, it is necessary to ensure that the directionalities of the branching points in the shape vectors corresponding to each other and constituting a pair in the pair list match. In other words, it is necessary to ensure that a one-on-one correlation is achieved with regard to the positions of the corresponding branching points in the pre-abridgment vector and the post-abridgment vector.

Once the pair list is compiled as described above, correction processing is executed to equalize the ratios of the norms of the individual shape vectors in the pair to the corresponding distances to the branching points, as shown in FIG. 13B. Namely, the ratios of the norm value of the shape vector closest to each landmark and the distances between the landmark and the corresponding branching points along the route containing the shape vector in the initial pre-abridgment map are measured. Based upon these measured values, the position of the landmark on the abridged map is calculated so as to equalize the ratios of the norm values of the corresponding shape vector in the pair list and the distances from the landmark to the individual branching points to the ratios in the initial map. Finally, the landmark is displayed at the position thus calculated.

Since the shapes of the roads and the distances indicated in the abridged map obtained by converting the regular map to the abridged map become different, it is necessary to convert the coordinates of the relevant landmarks (stores located along the roads, etc.) in conformance to the changes in the road shapes and the distances, as part of the landmark position correction. Accordingly, positional parameters with regard to the position of each landmark prior to the conversion, i.e., the position of the landmark prior to the conversion expressed as a percentage from one end of the road (link), the side of the road on which the landmark is located and the distance indicating how far off the road the landmark is located, are determined. Then, the post-conversion landmark position in the corresponding road data having undergone the conversion is determined by using these three parameters. This process is now explained in reference to the specific example presented in FIGS. 14A and 14B.

Figure 14A:
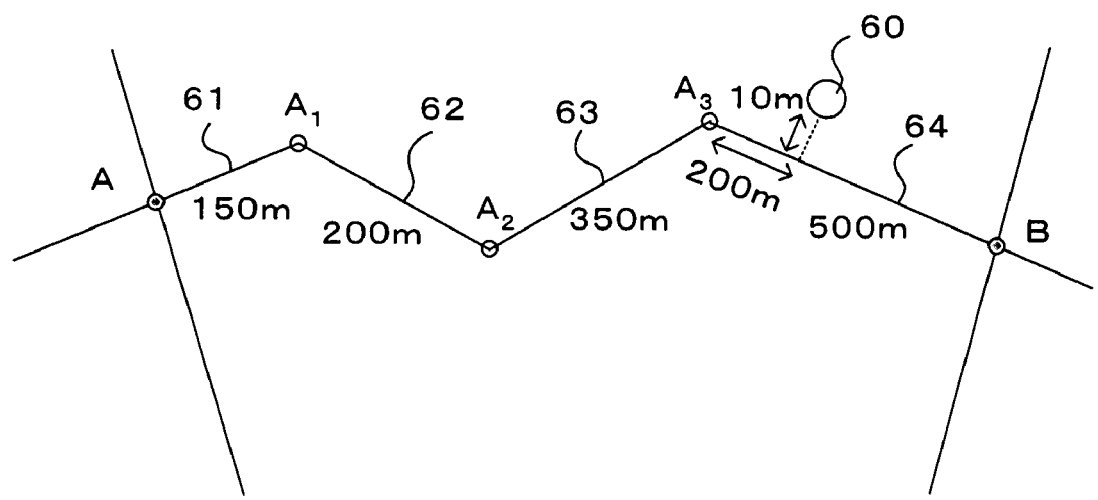
FIGS. 14A and 14B present a specific example of the landmark position correction.

FIG. 14A presents an example of a landmark position in a regular unabridged map. The road connecting a point A and a point B is constituted with a link 61 extending between the point A and a point A1, a link 62 extending between the point A1 and a point A2, a link 63 extending between the point A2 and a point A3 and a link 64 extending between the point A3 and the point B, and a landmark 60 is present along the road. The lengths of the links 61 to 64 are respectively 150 m, 200 m, 350 m and 500 m, and the road connecting the points A and B thus has a length which is the sum, i.e., 1200 m, of the lengths of the individual links constituting the road. The landmark 60 is located at a point 200 m measured from the point A3 toward the point B, i.e., at a point 900 m measured from the point A, on the left side of the road. In addition, the landmark 60 is located at a position distanced from the road by 10 m.

The three parameters explained earlier are determined with regard to the pre-abridgment landmark position. The first parameter, i.e., the ratio of the distance to the landmark from one end of the road (from the point A) to the entire distance is 900/1200=0.75 (75%). The second parameter, i.e., the side of the road on which the landmark is located, is determined to be the left side of the road heading toward the point B from the point A. The third parameter, i.e., the distance indicating how far the landmark is off the road, is determined to be 10 m.

Figure 14B:
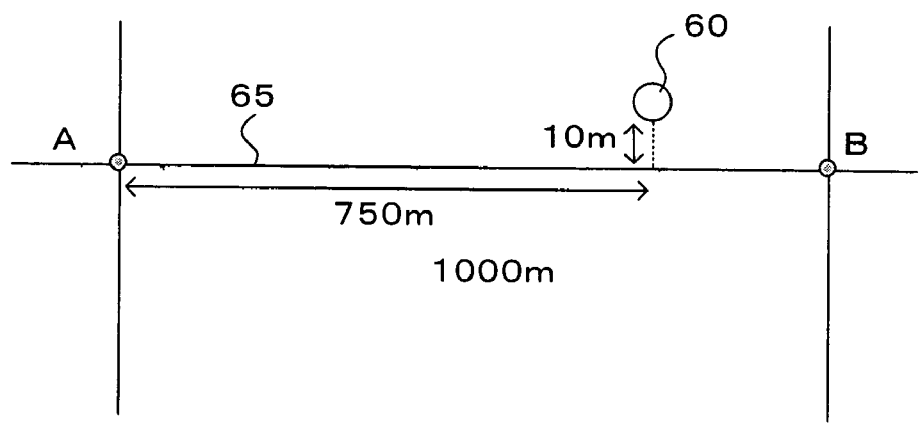

FIG. 14B presents an example of the landmark position in the abridged map. In this abridged map, the road connecting the point A and the point B is indicated with a single link 65 the length of which is 1000 m. When displaying the landmark 60 on this abridged map, the converted position of the landmark is determined based upon the three parameters having been obtained as described above. Namely, the distance from the point A is calculated to be 1000×0.75=750 m based upon the first parameter. In addition, based upon the second parameter and the third parameter, the position of the landmark is determined to be at the point located on the left side of the road (the link 65) viewed from the point A and distanced from the road by 10 m. The position of the landmark 60 is corrected as the landmark 60 is displayed at the position satisfying these requirements.

Through the processing explained above, the individual landmarks are indicated at corrected positions in the abridged map and the positional relationships between the roads and the landmarks are approximated to those in the unabridged initial map. Thus, the landmark in the initial map shown in FIG. 14A is displayed at the positions shown in FIG. 12B in the abridged map.

The embodiment described above achieves the following advantages.

(1) An intersection enlargement showing the target guidance-requiring intersection over a predetermined map range is created based upon the map data (step S30) and the intersection enlargement thus created is displayed at the screen of the display monitor 16 (step S40). Then, an indicator mark indicating the advancing path shape at the next guidance-requiring intersection is brought up on display over the intersection enlargement (step S62 or S72) As a result, the intersection enlargement indicating the shape of the target guidance-requiring intersection also allows the driver to learn the vehicle advancing direction at the next guidance-requiring intersection before the vehicle passes through the target guidance-requiring intersection so as to facilitate the driving operation.

(2) If the next guidance-requiring intersection is a circular intersection, a circular intersection mark is displayed as the indicator mark (step S62). As a result, the advancing path shape at the next guidance-requiring intersection, which is a circular intersection, is indicated to the driver in a driver-friendly manner.

(3) A decision is made based upon the road-type information recorded in the map data as to whether or not the next guidance-requiring intersection is a circular intersection (step S60). If the next guidance-requiring intersection is judged to be a circular intersection, a circular intersection mark is brought up on display (step S62), whereas if the next guidance-requiring intersection is not judged to be a circular intersection, a circular intersection mark is not displayed. In other words, the decision as to whether or not the next guidance-requiring intersection is a circular intersection can be made with ease, and based upon the decision, a circular intersection mark can be displayed as necessary in an optimal manner.

(4) If the next guidance-requiring intersection is present within a predetermined range outside the map range for the intersection enlargement, a regular intersection mark is displayed as the indicator mark (step S72). Thus, even when the next guidance-requiring intersection is a regular intersection, the advancing path shape at the next guidance-requiring intersection can be indicated to the driver in a driver-friendly manner as necessary.

(5) The decision as to whether or not the next guidance-requiring intersection is present in the predetermined range is made based upon the distance from the target guidance-requiring intersection to the next guidance-requiring intersection or based upon the distance from the boundary of the map range of the intersection enlargement to the next guidance-requiring intersection (step S70). Then, if it-is decided through either of the methods described above that the next guidance-requiring intersection is present within the predetermined range, a regular intersection mark is brought up on display (step S72), whereas if the next guidance-requiring intersection is not judged to be present within the predetermined range, no regular intersection mark is brought up on display. In other words, the decision as to whether or not a regular intersection mark should be brought up on display for the next guidance-requiring intersection can be made with ease and, based upon the decision, a circular intersection mark can be displayed as necessary in an optimal manner.

(6) A decision is made as to whether or not the distance to the target guidance-requiring intersection is equal to or less than a predetermined specific value (step S10) and if it is decided that the distance is equal to or less than the predetermined value, the shapes of the roads contained in a predetermined map range set around the target guidance-requiring intersection are simplified and an abridged map is thus created in step S20. In step S30, an intersection enlargement is created based upon the abridged map. As a result, a user-friendly intersection enlargement that clearly indicates the direction along which the vehicle should advance at the guidance-requiring intersection is provided.

It is to be noted that while an explanation is given above in reference to the embodiment on an example in which the present invention is adopted in conjunction with an intersection enlargement created based upon an abridged map, the invention may also be adopted in conjunction with an intersection enlargement created based upon a regular unabridged map.

While an explanation is given above in reference to the embodiment on an example in which the present invention is adopted in a dedicated navigation system installed for exclusive use in a vehicle, the present invention is not limited to this example. The control program for the navigation system 1 described above may be executed on a personal computer to allow the personal computer to function as a navigation system. In such a case, the current position detection device 14 and the like should be connected to specific I/O ports of the personal computer.

Figure 15:
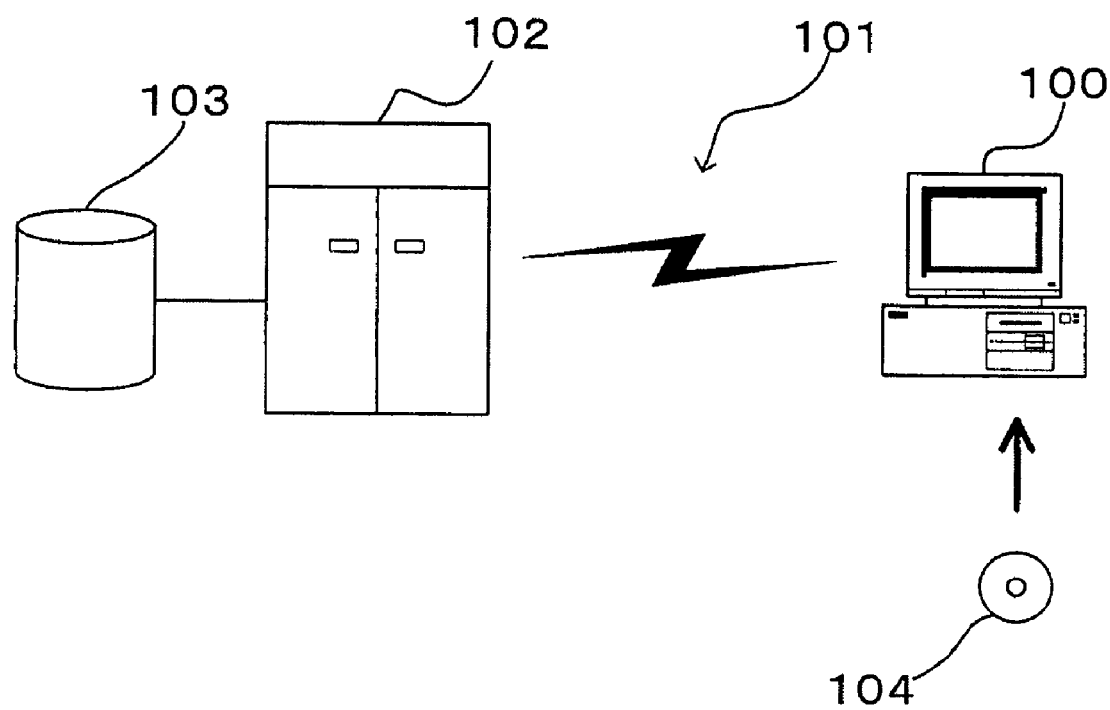

FIG. 15 shows how the program may be provided to a personal computer 100 in a recording medium such as a CD-ROM or a DVD or as a data signal on the Internet or the like. The personal computer 100 receives the program via a CD-ROM 104. In addition, the personal computer 100 has a function that allows it to connect with a communication line 101. A computer 102 is a server computer that provides the program stored in a recording medium such as a hard disk 103. The communication line 101 may be a line that enables Internet communication or it may be a dedicated communication line. The computer 102 reads out the program from the hard disk 103 and transmits the program to the personal computer 100 via the communication line 101. In other words, the program embodied as a data signal on a carrier wave is transmitted via the communication line 101. This means that the program can be distributed as a computer readable computer program product assuming any of various modes including a recording medium and a carrier wave. While reference 100 indicates a personal computer, the present invention in this mode may also be embodied in conjunction with a navigation system 1.

The above described embodiment is an example and various modifications can be made without departing from the spirit and scope of the invention.

What is claimed is:

1. A navigation system comprising:
an intersection enlargement creation unit that creates based upon map data an intersection enlargement over a predetermined map range around a target guidance-requiring intersection present on a recommended route, at which a turn should be made;
an intersection enlargement display unit that displays at a display monitor the intersection enlargement having been created by the intersection enlargement creation unit; and
a mark display unit that displays an indicator mark indicating an advancing path shape at a next guidance-requiring intersection immediately beyond the target guidance-requiring intersection over the intersection enlargement on display at the display monitor.

2. A navigation system according to claim 1, wherein:
when the next guidance-requiring intersection is a circular intersection, the mark display unit displays a circular intersection mark indicating the advancing path shape at the next guidance-requiring intersection as the indicator mark.

3. A navigation system according to claim 1, further comprising:
a first decision-making unit that makes a decision based upon road type information recorded in the map data as to whether or not the next guidance-requiring intersection is a circular intersection, wherein:
if the first decision-making unit determines that the next guidance-requiring intersection is a circular intersection, the mark display unit displays the circular intersection mark, whereas if the first decision-making unit does not determine that the next guidance-requiring intersection is a circular intersection, the mark display unit does not display the circular intersection mark.

4. A navigation system according to claim 1, wherein:
when the next guidance-requiring intersection is present within a predetermined range outside the map range for the intersection enlargement, the mark display unit displays a regular intersection mark indicating the advancing path shape at the next guidance-requiring intersection as the indicator mark.

5. A navigation system according to claim 4, further comprising:
a second decision-making unit that makes a decision based upon a distance from the target guidance-requiring intersection to the next guidance-requiring intersection as to whether or not the next guidance-requiring intersection is present within the predetermined range, wherein:
if the second decision-making unit determines that the next guidance-requiring intersection is present within the predetermined range, the mark display unit displays the regular intersection mark, whereas if the second decision-making unit does not determine that the next guidance-requiring intersection is present within the predetermined range, the mark display unit does not display the regular intersection mark.

6. A navigation system according to claim 4, further comprising:
a second decision-making unit that makes a decision based upon a distance from a boundary of the map range for the intersection enlargement to the next guidance-requiring intersection as to whether or not the next guidance-requiring intersection is present within the predetermined range, wherein:
if the second decision-making unit determines that the next guidance-requiring intersection is present within the predetermined range, the mark display unit displays the regular intersection mark, whereas if the second decision-making unit does not determine that the next guidance-requiring intersection is present within the predetermined range, the mark display unit does not display the regular intersection mark.

7. A navigation system according to claim 1, further comprising:
a distance decision-making unit that makes a decision as to whether or not a distance to the target guidance-requiring intersection is equal to or less than a predetermined specific value and;
an abridged map creation unit that creates an abridged map by simplifying shapes of roads present within the predetermined map range if the distance decision-making unit determines that the distance to the target guidance-requiring intersection is equal to or less than the predetermined value, wherein:
the intersection enlargement creation unit creates the intersection enlargement based upon the abridged map created by the abridged map creation unit.

8. A navigation method, comprising:
creating an intersection enlargement for a target guidance-requiring intersection present on a recommended route, at which a turn should be made, based upon map data over a predetermined map range;
displaying the intersection enlargement having been created at a display monitor; and
displaying an indicator mark indicating an advancing path shape at a next guidance-requiring intersection present immediately beyond the target guidance-requiring intersection over the intersection enlargement on display at the display monitor.

* * * * *

UNITED STATES PATENT AND TRADEMARK OFFICE
CERTIFICATE OF CORRECTION

PATENT NO.       : 7,623,964 B2                                       Page 1 of 1
APPLICATION NO. : 11/541534
DATED            : November 24, 2009
INVENTOR(S)      : Morita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 661 days.

Signed and Sealed this

Fourteenth Day of December, 2010

David J. Kappos
*Director of the United States Patent and Trademark Office*